Aug. 22, 1967 L. BRUGLEMANS 3,337,692

LINE LOCKOUT IN A CROSS POINT SWITCHING SYSTEM

Filed June 26, 1964

6 Sheets-Sheet 1

INVENTOR
Lucas Bruglemans
BY
C. A. Gulbrandsen
ATTY.

Aug. 22, 1967 L. BRUGLEMANS 3,337,692

LINE LOCKOUT IN A CROSS POINT SWITCHING SYSTEM

Filed June 26, 1964

6 Sheets-Sheet 2

Aug. 22, 1967 L. BRUGLEMANS 3,337,692

LINE LOCKOUT IN A CROSS POINT SWITCHING SYSTEM

Filed June 26, 1964

6 Sheets-Sheet 3

Aug. 22, 1967 L. BRUGLEMANS 3,337,692

LINE LOCKOUT IN A CROSS POINT SWITCHING SYSTEM

Filed June 26, 1964

6 Sheets-Sheet 4

Aug. 22, 1967 L. BRUGLEMANS 3,337,692

LINE LOCKOUT IN A CROSS POINT SWITCHING SYSTEM

Filed June 26, 1964

6 Sheets-Sheet 5

United States Patent Office 3,337,692
Patented Aug. 22, 1967

3,337,692
LINE LOCKOUT IN A CROSS POINT SWITCHING SYSTEM

Lucas Bruglemans, Antwerp, Belgium, assignor to Automatic Electric Laboratories, Inc., Northlake, Ill., a corporation of Delaware Filed June 26, 1964, Ser. No. 378,351
6 Claims. (Cl. 179—18)

ABSTRACT OF THE DISCLOSURE

Apparatus for determining the identity of line circuits in the lockout state in a marker controlled crosspoint switching system. The line circuit includes a line, a cutoff and a lockout relay with the latter two operating in series. The lockout relay, however, additionally completes a hold circuit for itself in series with the line and a second one of its windings.

Figure 1:
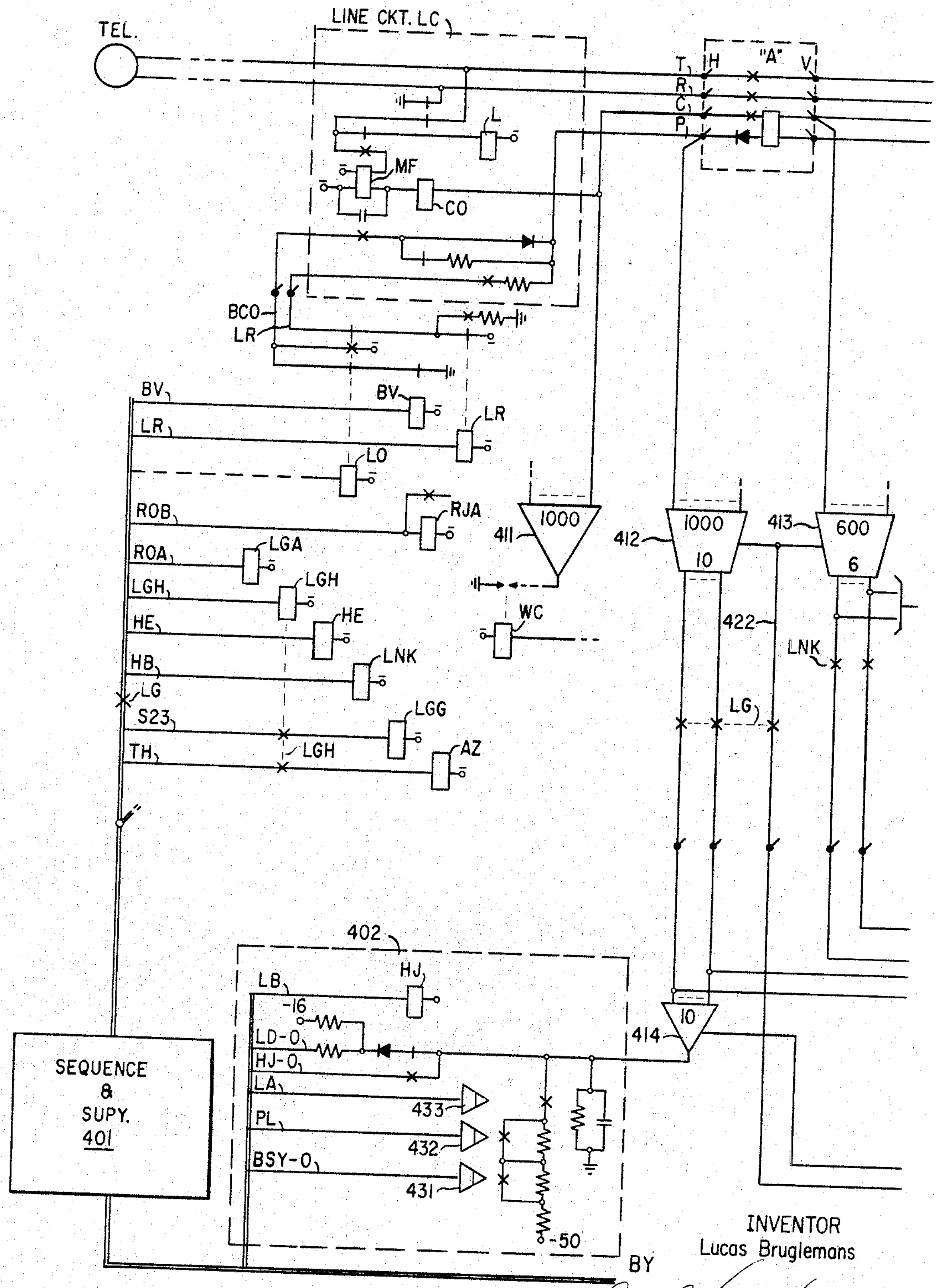

The line group marker has a relay within itself that may be operated under external control to cause all locked out lines to be identified by placing the proper potential through contacts of the lockout relays to the respective pull leads. A register circuit is also included to store the last line identified so that the identification circuit will not cycle to the same line but will take them in sequence. Each line identity is forwarded to a common translator store from which a printed record is subsequently made.

This invention relates to a communication switching marker selection system, and more particularly to a line lockout circuit and control features of the marker.

A copending U.S. patent application Ser. No. 230,887, filed Oct. 16, 1962 by K. K. Spellnes, now Patent No. 3,170,041, describes a Communication Switching System having marker controlled crosspoint switching networks, and common control equipment comprising register-senders and translators. Each register-sender group includes electronic apparatus shared on a time division multiplex basis, with a ferrite core array used in a recirculating arrangement. The system provides full translation on every call from the directory number to an equipment location number. Each subscriber in the exchange is identified to the other subscribers by the office code, or one of a number of office codes, of that exchange and by a line directory number. His line is also assigned in that exchange a particular appearance on a set of terminals of the switching equipment. This arrangement permits complete flexibility in the assignment of telephone numbers and terminals on the switching equipment, and eliminates the necessity for a line intermediate distributing frame. Any change of subscriber service is accomplished simply by changing the instructions stored in the translator. The translator uses a magnetic drum. Changes on the drum are made simply by keying instructions in from a control console. The translator equipment is arranged to be accessed from the register-sender groups. The translator assigns itself to a register at various times during dialing, for example at the end of a group of digits representing an office code or other special code.

The switching network comprises local subscriber line groups of 1000 lines each, selector groups, and incoming trunk groups. Each line group provides crosspoint switching matrices for originating connections from calling local subscriber lines to originating junctors which are connected to selector inlets, and also through a register matrix to register junctors; and also provides materices for terminating connections between terminating junctors and called local subscriber lines, the terminating junctors being accessed directly from selector outlets. In the trunk group incoming trunks are connected directly to selector inlets, and also through a crosspoint switching network to register junctors.

On originating calls, both in the line group from local subscriber calling lines, and in the trunk group from incoming trunks, the marker during the establishment of the connection to a register after identifying the calling line or trunk for use in establishing the connection to the register, also transmits this line or trunk identification by high speed serial binary code to the register for storage. If ticketing is required the line number identification which has been received from the marker as an equipment location number is supplied to the translator to obtain the calling subscriber directory number.

Another copending U.S. patent application Ser. No. 240,497, filed Nov. 28, 1962, by Esperseth et al. issued as U.S. Patent No. 3,275,752, covers the crosspoint switching network arrangement used in this system. The switching network comprise matrices of reed relays in coordinate arrays. The stages are arranged in tandem with a relay at each crosspoint of each stage, and with the operate or pull winding of successive stages connected in series. Each relay has a diode connected in series with its pull winding to prevent sneak paths involving more than one relay per stage. Operate potentials are applied to a selected pair of terminals, one at each end of a set of stages in the network, to operate the relays in a series path through the pull windings of one relay in each stage to establish a connection. No marking potential are required on the interstage links between the selected pair of terminals. The stages are arranged so that through up to three stages having the pull windings connected in series there is a unique path between any two terminals on opposite sides of this set of stages. Each crosspoint relay has a second winding in series with a normally open set of its own contacts, and the stages are serially connected so that after the relays in their selected paths have been operated a hold connection extends in series through the second winding and series contacts of the relays in the path. Cutoff or hold relays in the terminating units may also be connected in series in the hold path.

Another copending U.S. patent application Ser. No. 231,425, filed Oct. 18, 1962, by L. Bruglemans, now Patent No. 3,211,837, covers a Line Identifier Arrangement for this system. This line identifier makes use of the diodes already provided in series with the pull windings in the main switching network matrices. Each line circuit includes a line relay which operates upon the closing of the line loop for a call origination to close a single contact which applies a marking potential to the pull conductor at the line terminal of the first switching matrix. This potential is such as to forward bias diodes in the switching network and therefore appears through these diodes and winding through the successive stages in series. The lines are divided and subdivided so that in the first stage each matrix card at its input links to the line circuits constitutes a subgroup, at each successive stage these are grouped into progressively larger groupings. Thus for example at the input links of the third stage each input can come from a different one of the second-stage groups, and the pull leads taken as a group to a scanner to select one of the second-stage groups, and to set a device to record the identity of that group. It is only necessary to use the input conductors of one of the third stage matrix cards, since each matrix has a path to every one of the line circuits through the other stages. Having selected ones of the second-stage groups, the input conductors from one of the matrices of that group at the input of the second stage may be connected through a connect circuit operated from the set second-group identification device to a scanner to select one of the first-stage groups in which the call appears and to set another device to record the identity of that group. The result of that test is then used to connect the input terminals of one of the first stage cards to a scanner to select a particular line which is calling, and to set another device to record the identity of the line. The second-stage groups, first stage groups, and lines within a first-stage group may be designated respectively hundreds, tens, and units.

An object of this invention is to provide line lockout for subscribers lines in a common control crosspoint switching system.

A feature of this invention is a lockout line circuit arranged for use in a cross-point switching system.

Another feature of this invention is a means in the line circuit for marking itself busy when in the lockout state.

Another feature of this invention is the means for removing the lockout state of the line circuit upon the associated subscribers station returning to the on-hook state.

Another feature of this invention is the means in the line group marker for removing the lockout state, and performing a line identification operation.

Still another feature of this invention is the means in the line circuit for reinstating the lockout state thereof upon completion of the line identification operation.

Figure 2:
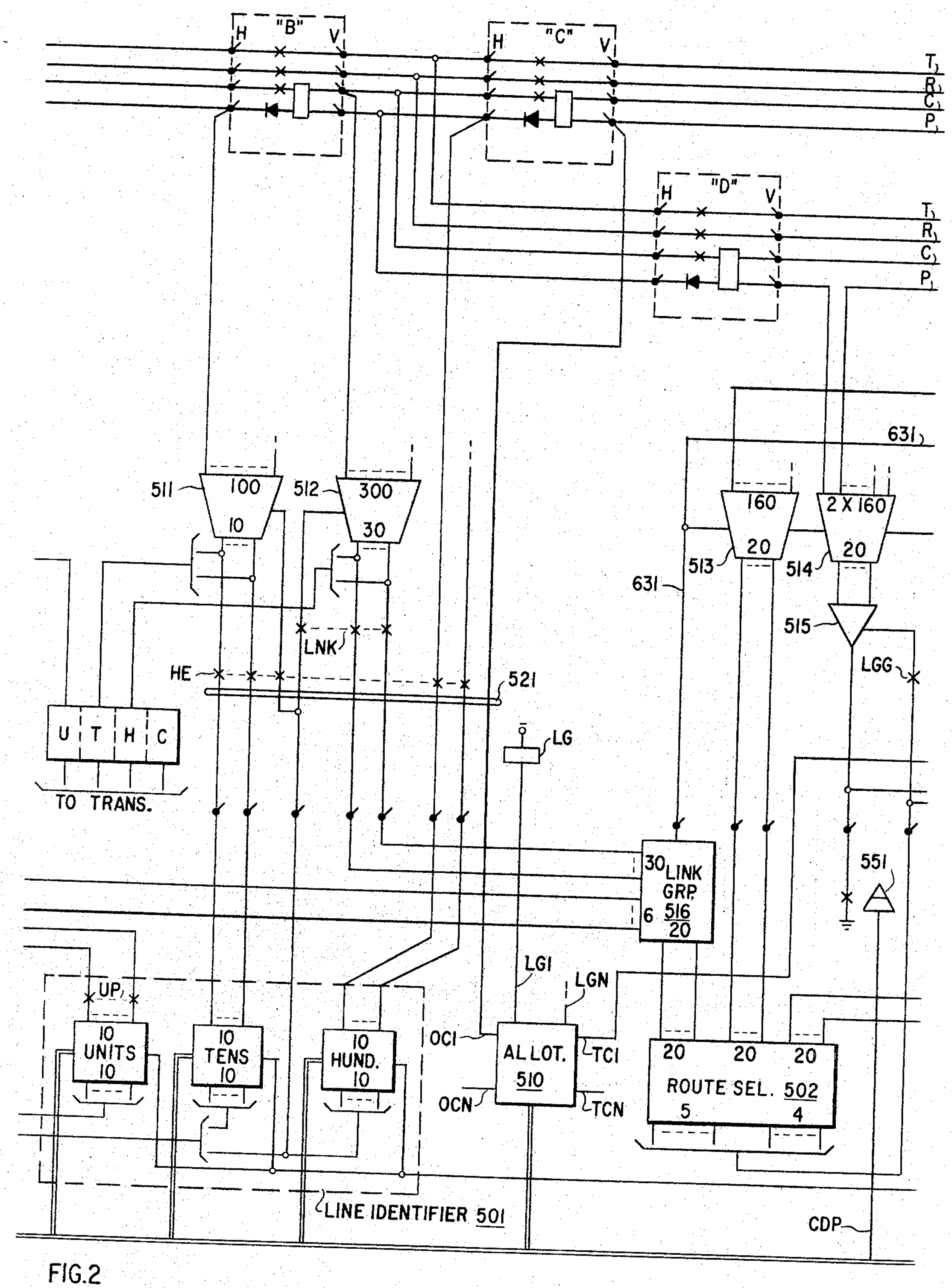
Figure 3:
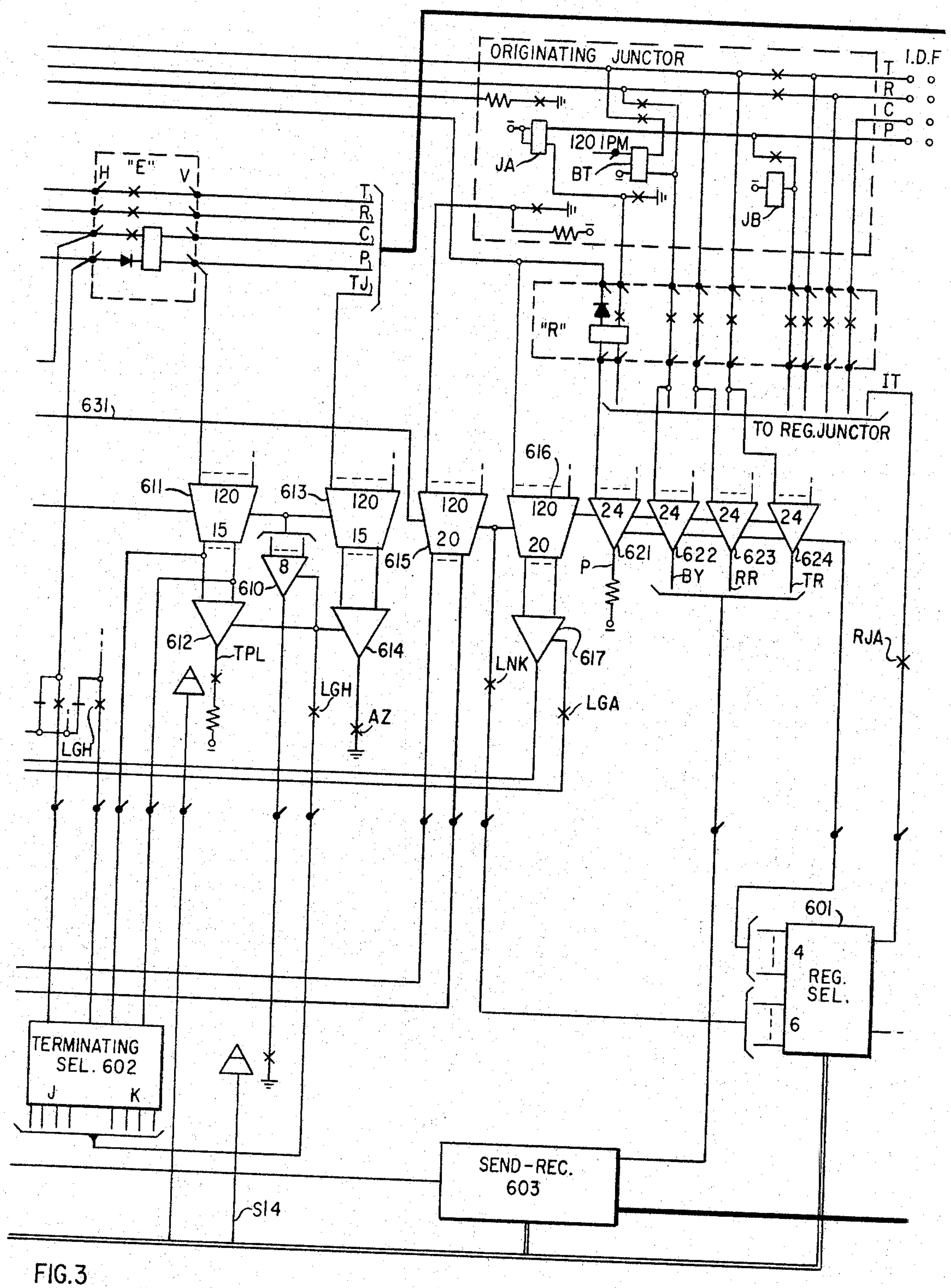
Figure 4:
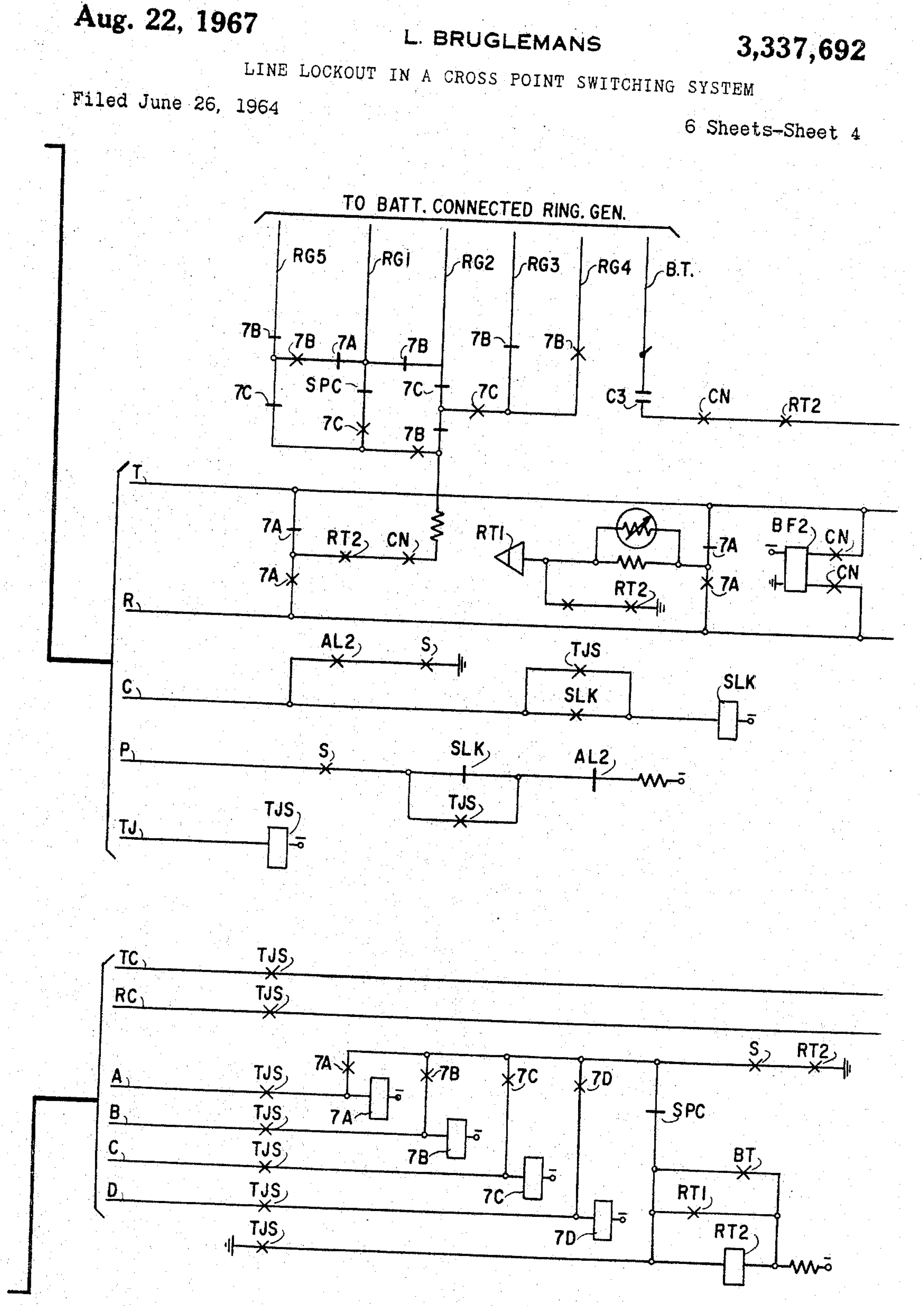
Figure 5:
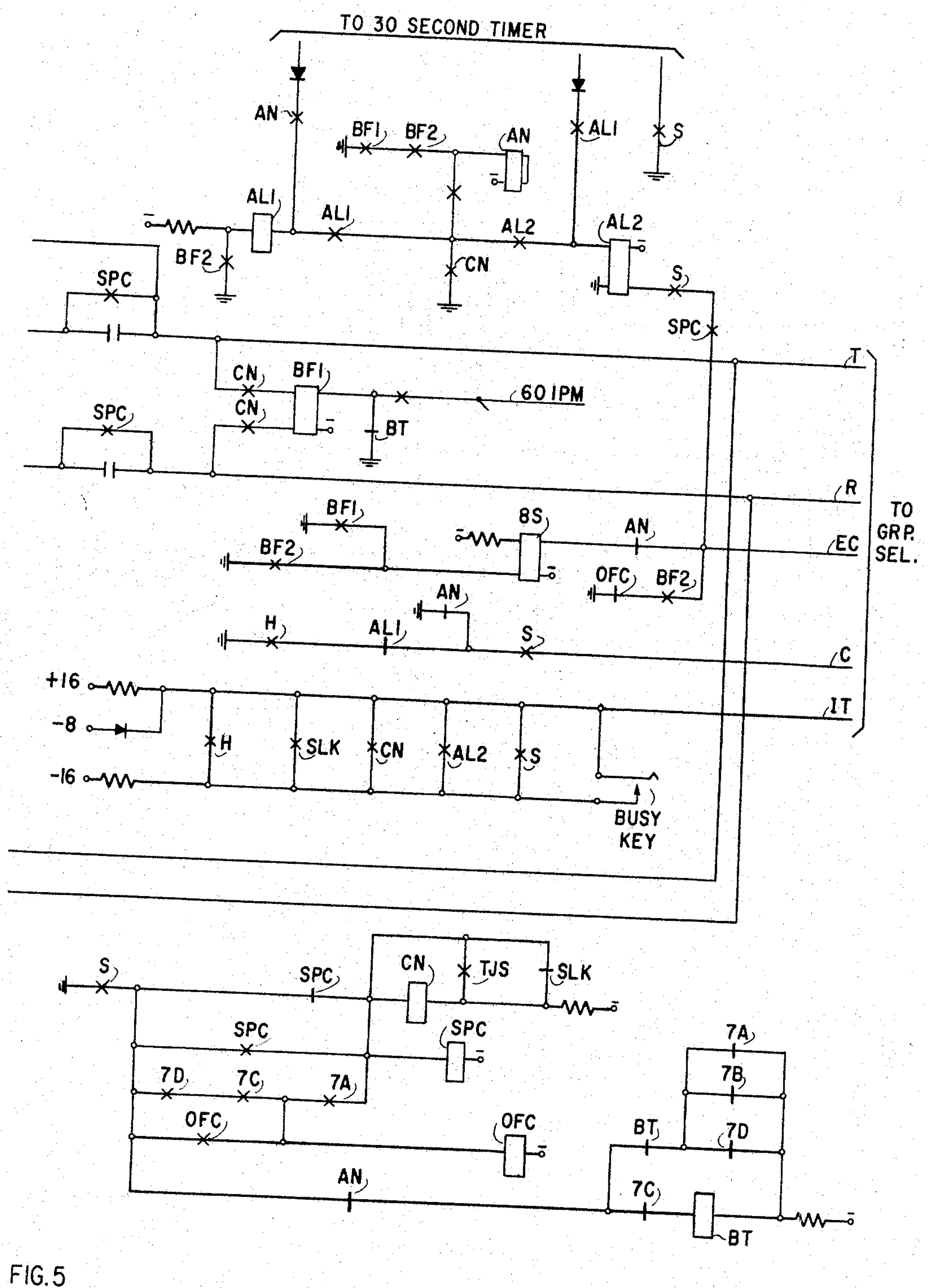

The above mentioned and other objects and features of this invention and the manner of attaining them will become more apparent, and the invention itself will be best understood, by reference to the following description of an embodiment of this invention taken in conjunction with the accompanying drawings comprising FIGS. 1–6 wherein;

FIGS. 1–3 comprise a functional block and schematic diagram of a cross-point switching network line group and line group marker of the common control system;

FIGS. 4 and 5 comprise a circuit of the terminating junctor.

Figure 6:
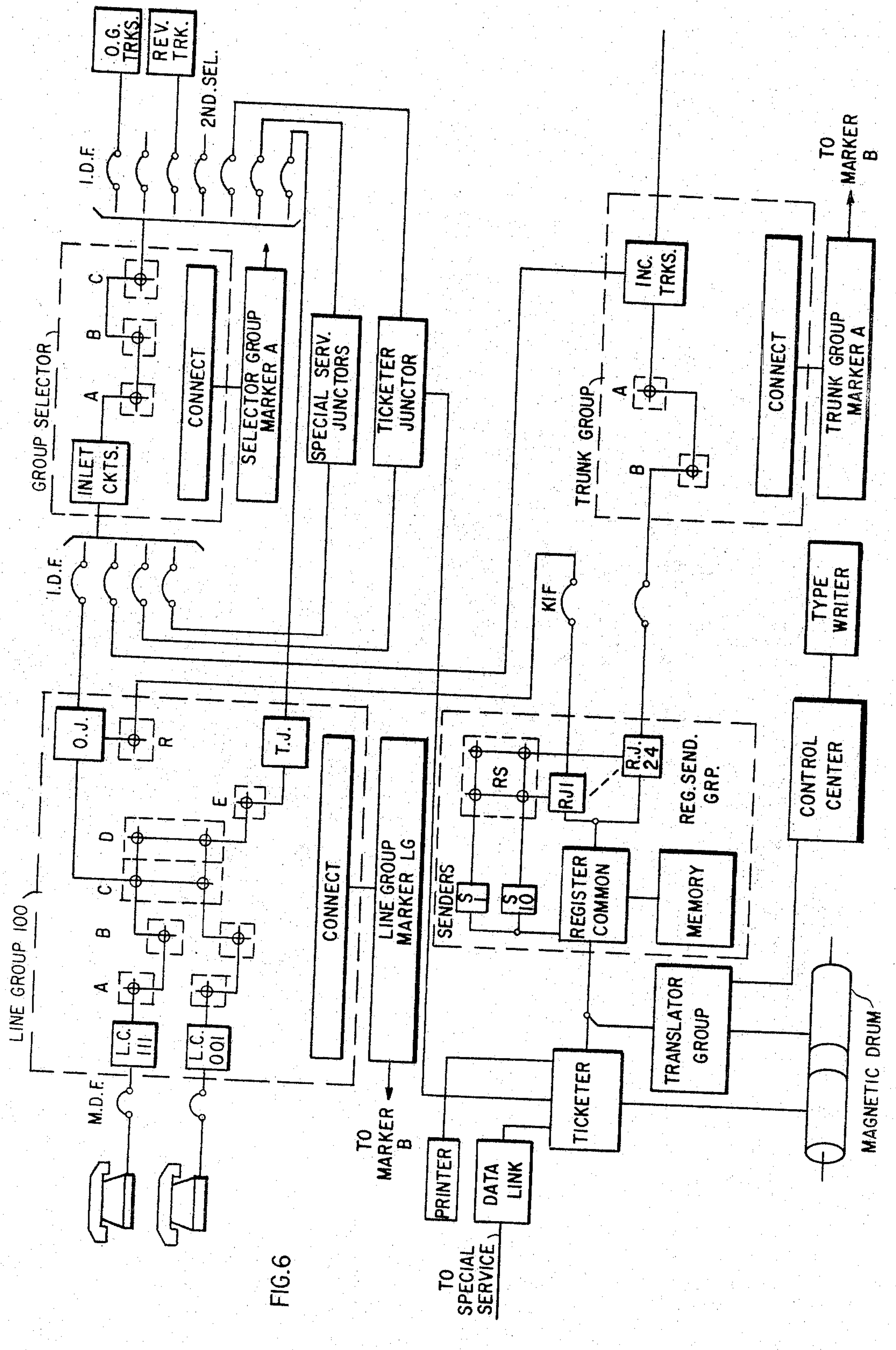

FIG. 6 is a block diagram showing the interconnections of the various components of a cross-point switching system.

*General*

When a subscriber lifts the handset, the line group marker LG goes into action by detecting the originating call mark, identifying the calling line, and selecting an idle register junctor to the register-sender. A path is then temporarily established from the calling telephone to the register junctor such as RJ1 via the A, B and C matrices, an originating junctor OJ and the R matrix. Dial tone is now applied to the subscriber line. The dialed digits are temporarily stored in the memory, coded, and processing continued as these digits are passed to the translator analyzed for class of incoming call, and the instructions are selected from the magnetic drum memory and returned to the register sender for the further processing of the call.

Upon receipt of the remaining digits, the translator returns switching instructions corresponding to the called number as stored in the memory drum. The instructions are transmitted from the register-sender RS via one of the senders such as S1 and the originating junctor of the originating line group to the group selector GS.

In the group selector GS, the instructions are analyzed by the marker GSM, an idle terminating junctor in the terminating line group is located, and a path established to that line group via the A, B and C matrices of the group selector. The remaining instructions are followed by the line group marker to locate the called line terminals, select and seize a path from the terminating junctor through the E, D, C, B and A matrices to the called line. The terminating junctor supplies the ringing, answer supervision, and the talking battery for both parties when the call is answered.

Since the system is a common control operation, the markers of the line group and group selector function only to serve the assigned portion of the call processing and then release to serve other calls. The register-sender RS and the translator TR are functioning on a time division basis and therefore are processing several calls practically simultaneously. The temporary signaling and control paths are released for further service, while only the talking paths are held through the switching matrices and junctors.

*Common control line group*

A common control line group and marker are shown in functional block and schematic diagram in FIGS. 1–5, with the switching network and marker shown in FIGS. 1–3 and a terminating junctor in FIGS. 4 and 5. The arrangement of the switching network and the details of the marker are shown in several copending U.S. patent applications, one of which is Ser. No. 304,892 filed Aug. 27, 1963, for a Marker for a Communication Switching Network by W. R. Wedmore, now Patent No. 3,293,368.

A typical originating and terminating transmission path showing one crosspoint of each stage appears across the top of FIGS. 1–3. There are 1,000 subscribers lines served by the group having individual lockout line circuits LC. The A and B stages are divided into 100-line subgroups, each having 10 A matrices and 6 B matrices in a primary secondary spread. Each A matrix has 10 horizontal terminals individual to the line circuits, and 6 vertical terminals. Each B matrix has 10 horizontal terminals and 5 vertical terminals, so that there are 30 B stage vertical terminals for each 100-line subgroup. The C and D stages form a tertiary stage, with the C stage serving originating calls and the D stage serving terminating calls. There are a total of 30 C matrices a corresponding 30 D matrices. Each C matrix and each D matrix has 10 horizontal terminals, each of which is connected to a B stage vertical terminal of a different hundreds subgroup. There are 120 originating junctors each having a connection to a C matrix vertical terminal, a connection to an R matrix horizontal terminal, and a connection to a selector inlet. There are a total of 6 R matrices each having 20 horizontal terminals to individual originating junctors, and 4 vertical terminals to register junctors. In the terminating path there are up to 8 E matrices each having 20 horizontal terminals to individual D matrix vertical terminals, and 15 vertical terminals to individual terminating junctors.

The line group marker connect circuits, which are individual to the line groups, are shown across the center of FIGS. 1–3. Relay trees are shown as trapezoids or triangles, with the number of leads on each side of the tree indicated therein, the apex of a triangle being a single lead. Some of the relays which control the sequence of operation are shown. A relay contact set shown on a line representing a plurality of conductors is used to indicate that there is an individual contact set for each conductor.

Marker apparatus common to a plurality of line groups, shown across the bottom of FIGS. 1–3, comprises electronic scanners and other control circuits. The sequence and supervisory unit 401 supplies sequence state signals and clock pulses for the marker. A line identifier 501 comprising a hundreds scanner, tens scanner, and a units scanner is used to identify the subscriber line terminal for both originating and terminating calls. A register selector 601 selects an idle register on originating calls. A terminating selector 602 identifies and selects a terminating junctor requesting service for a terminating call. A send receive unit 603 transmits line number identification information to the register during an originating call, and communicates with the sender during a terminating call, using a high speed serial binary transmission arrangement.

The marker includes relay drivers designated by small triangles with a line across it parallel to the base and a make contact adjacent to the apex of the triangle, and represents a single transistor amplifier driving a relay winding which operates the single make contact.

The operation for an originating call is initiated when a subscriber closes his line loop and causes his line relay to operate. Negative potential via lead LR, a resistor in the line circuit, and the contacts of the line relay is applied to the P conductor of the line terminal. This potential extends via the pull windings and associated diodes of the A, B and C stages and appears at the conductor OC1 from one of the vertical C terminals. The allotter 510 detects this potential as an originating call in line group 1 and applies a potential via lead LG1 to operate the relay LG in the corresponding line group. A signal is also supplied to the sequence circuit 401, to cause the signal HF to become true and via a contact of relay LG to cause relay HE in the corresponding line group 1 to operate. This connects the ten P leads from the horizontal terminals of one of the C matrices to the input of the hundreds scanner. The sequence circuits then supply a signal to start the hundreds scanner until it detects the calling potential and thereby identifies the hundreds group, applying a marking potential to the corresponding output lead of the scanner. Ten output leads from the hundred scanner are taken through respective contacts of relay HE to the set of conductors 521 to control the relay tree 511, which connects the ten P leads from the horizontal terminals of one of the B matrices in the selected hundreds group through the relay tree 511 and contacts of relay HE to the tens scanner. The sequence circuits supply a signal to the tens scanner to start it and identify the tens group in which the calling line appears. Ten leads from the hundreds scanner outputs and ten from the tens scanner outputs are taken through contacts of relay LG and via conductor group 422 to control the relay trees 412 and 413. The ten P leads from the A matrix of the calling line are taken through relay 412 and contacts of relay LG, and thence through contacts of relay UP to the input of the units counter.

The marker is now ready to pre-select a register. Relay RJA has operated via lead ROB and contacts of relay LG from the sequence circuits 401. The 24 idle test leads IT from the register junctors are taken via contacts of relay RJA to the inputs of a register selector 601, which is started in response to a signal for the sequence circuits 401 to select one of the registers supplying a signal to one output lead in a group of six and another output lead in a group of four. Busy indicating potential is also placed on the selected idle test lead to prevent selection of the register junctor by another marker. The six R matrices, are taken through contacts of relay LNK to control the relay trees 615, 616 and 621–624 to select the group of input leads to each corresponding to the selected R matrix. A signal is also supplied via one of three conductors in line 631, depending on the R matrix selected, to a link grouping unit 516. Selection of an R matrix narrows the selection of a route down to 20 originating junctors connected to the horizontal terminals thereof. The 20 idle test leads from these originating junctors are connected through relay tree 615 to inputs of the route selector 502.

The sequence next enables the units scanner in line identifier 501 to complete the identification of the calling line and enable relay 414, so that the P lead from the calling line is now connected through relay trees 412 and 414 to circuit 402.

The C conductors of the 30 BC links connected to the selected hundreds group have been connected through relay tree 512 to the link grouping unit 516. Twenty of these leads corresponding to links extending through the C matrix to the twenty selected originating junctors are connected under control of signal on the conductors 631 to the route selector 502. The leads from busy links have a negative potential thereon. The C conductors from the six AB links on the A matrix to the calling line have been conected through relay tree 413 to unit 516. Each of these six links which is busy makes five of the BC links unavailable, and therefore negative potential is applied to these BC link C leads in unit 516. The route selector 502 is now enabled by the sequence circuits to search for coincidence of an available originating junctor and an available originating junctor and an available BC link, and to select the corresponding route by a signal on one output lead in a group of five and another output lead in a group of four. These output leads are connected through contacts of relay LGA to control relay tree 617.

The sequence circuits now supply a signal to operate relay LR, to remove negative battery potential and apply ground potential to the P leads of all line circuits having their line relays operated.

The sequence control now enables the send receive circuit 603 which receives the identity of the calling line from the line identifier 501. The send receive circuit is connected via the three leads TR, RR and BY through relay trees 522–624 to the register junctor. The BY lead is used for control and the information signals are sent via leads TR and RR.

The connection is next established by various relay drivers being operated responsive to signals from the sequence circuits 401. A path then extends from negative battery potential through a resistor and contacts of relay drivers 431, 432 and 433, relay trees 414 and 412, the operate windings of the crospoint relays via a unique path through the A, B, and C stages of the switching network, relay trees 616 and 617, and the contacts of relay driver 551 to ground. The connection also extends from negative battery potential through a resistor and relay tree 621, thence via the operate winding of the crosspoint in the R matrix to the ground potential on the horizontal P lead. A hold path is energized by a ground signal (not shown) supplied from the register junctor via the hold winding of the crosspoint in the R matrix in series with relay JA in the originating junctor. Ground via contacts of relay JA extend through a resistor and the hold windings of the operated crosspoints in the C, B and A matrices in series with the cutoff and MF relays in the line circuit. Operation of the MF relay releases the line relay, and also connects ground from lead BCO to the P conductor of the line terminal thereby marking the line busy. The marker verifies that the line has been made busy by checking for the ground potential on a P lead extending through the relay trees 412 and 414 and thence through a diode and resistor to lead DL–O. Ground potential on this lead makes the signal BSY true in the sequence circuits 401, and the marker is then released.

For a terminating call the group selector seizes a terminating junctor by ground on the EC lead to operated relay 8S. Contacts of relay S place negative potential on the idle test lead IT back to the group selector, and at the other side of the terminating junctor connects negative potential to the lead P to the vertical terminal of the E matrix. This negative potential extends through the pull winding of the E matrix and via break contacts of relay LGH to lead TC1 to the allotter. When the marker is idle the allotter recognizes the call on lead TC1 to apply a signal via lead LG1 to operated relay LG in the corresponding line group. A signal is also supplied by the allotter to the sequence and supervisory circuits 401 to cause the marker to start the terminating call sequence. A signal is supplied via contacts of relay LG to operate relay LGH. The P lead from one horizontal terminal of each of the E matrices is now connected through make contacts of relay LGH to the terminating selector 602, and at the same time the break contacts disconnect these P leads from the lead TC1. The terminating selector 602 is then enabled to select one of the E matrices and supply an output signal to one of the leads in group J and one of the leads in group K. These 8 output leads are taken through contacts of relay LGH to relay trees 610, 612 and 614. The sequence circuits supply a signal on lead S14 to operate a relay driver, which supplies ground through relay tree 610 to one of 8 leads corresponding to the selected E matrix, which in turn operates and locks the relay trees 613, 611, 514 and 513. A signal is also supplied to one of the three conductors in group 631 in accordance with the selected E matrix to the link grouping circuit 516.

Fifteen B leads from the verticals of the selected E matrix to the link grouping circuit 516.

Fifteen B leads from the verticals of the selected E matrix are now connected through relay tree 611 to inputs of the terminating selector 602, which is again enabled to select the lead on which the call appears and to place a signal on one of the output leads in group J and one in group K, which this time operates the relay trees 612 and 614.

Ground potential through contacts of relay AZ and relay trees 614 and 613 is extended to the lead TJ of the selected terminating junctor to operate the relay TJS therein. This connects the terminating junctor to the send receive circuit 603. Signals are now received from the sender via the T and R leads from the group selector and thence through the contacts of relay TJS to leads TC and RC to the send receive circuit. The identity of the called line is extended from the send receive circuit 603 to the line identifier 501 and supplied to the outputs of the hundreds, tens and units scanner. Party identification information is also supplied from the send receive circuit 603 via leads A, B, C and D to the terminating junctor and via contacts of relay TJS operate and lock one or more of the relays 7A, 7B, 7C and 7D in accordance with the party identification code. Output signals from the line identifier operate the relay trees 412, 413 and 414.

The busy test of the called line is now made. The P lead at the line terminal extends through relay trees 412 and 414 and via the diode and resistor to lead LD–O. If the called line is busy ground from lead BCO extends through the diode and contact of the MF relay to conductor P and appears at lead LD–O. In the sequence circuits 401 this signal will cause signal BSY to become true and supplied to the send receive circuit 603. A signal is sent from the send receive circuit back over leads TC and RC to the sender, and also ground is applied to each of the leads, A, B and D to operate relays 7A, 7B and 7D in the terminating junctor causing relay BT to operate via break contacts of normal relay 7C. This causes busy tone to be applied to the calling line. The marker would then release.

If on the other hand the called line is idle the negative battery potential normally on lead LD–O makes signal BSY false, and therefore the signal on lead BSY–O true to operate relay driver 431. In response to the signal BSY–O being true the sequence state is also advanced to enable the route selector 502. The C leads from the 20 horizontal terminals of the selected E matrix are connected through relay tree 513 to the route selector. The connections of the C leads from the link through link grouping circuit 516 are the same as for an originating call. The route selector is then enabled to scan and select an available route. To establish the connection a path extends from negative battery potential through a resistor and contacts of relay drivers 431, 432 and 433, relay trees 414 and 412, the pull winding of the relays in the stages A, B and D, relay trees 514 and 515, to ground via the contacts of relay driver 551. At the same time negative potential is extended from negative battery potential through a resistor and contacts of a relay driver, and thence relay trees 612 and 611 and the pull winding of the crosspoint in the E matrix to the ground via relay trees 514 and 515. To hold the connection, ground extends via contacts of relay 8S and AL2 in the terminating junctor to the C conductor and thence via the hold windings of the crosspoints in the E, D, B and A stages and the cutoff and MF relays in the line circuit. Operation of the MF relay extends ground from the lead BCO through the diode and contacts of the MF relay to lead P at the line terminal. To verify establishment of the connection the marker now checks the potential on lead LD–O and if it is at ground the signal BSY becomes true in the sequence circuits to cause the marker to be released.

*Line circuit*

The line circuit is shown in FIG. 1.

When the line is in the "off hook" condition, relay L pulls and prepares the way for the normal line identification.

After selection of an idle path the line circuit is connected with the register junctor via the originating junctor. At that time relays CO and MF are pulled in series by a ground on the C lead.

Relay L releases and relay MF returns busy ground to the line group.

When for any reason ground on the C lead disappears, relay CO releases immediately. As long as the line remains in the off hook condition, relay MF is held over the loop, marks the line circuit busy and prevents the reoperation of relay L. It is apparent that this mode of providing lock out is applicable for the calling as well as for the called party.

To remove the lock out condition the C lead has only to be grounded.

*Identification of lines in lock out*

Identification and registering of lines in lock out may be done one or more times a day. Since line identification equipment (line group marker) and a means for registration already exist as integral parts of the system it is advantageous to use this existing equipment for the handling of lockout service. Considering FIG. 1 it can be seen that the circuit for normal calling line identification is closed when relay L is operated (MF is released).

When the C lead is grounded CO and MF operate and L releases.

In any case, when MF is operated the pull lead is grounded as a busy indication.

When the identification of lines in lock out has to be done, the marker gets a start signal and verifies if there is no originating or terminating call waiting. If not, the marker operates relay LO. The ground on lead BCO is replaced by battery and battery from lead LR is removed. At that time battery appears on the pull leads of only those lines which are in lock out.

The marker now proceeds in the same manner as for a calling line identification and stores the identity. Before identifying the next line in lock out the marker checks to determine if an originating or terminating call is waiting.

The line marker identifies the lines in the same way as for an ordinary originating call. Since no connection with a register junctor has to be made, there is no question of selecting an idle path through the matrices, some sequence states are bridged for this kind of operation.

For the same reasons the identification of a line in lock out lasts only a fraction of the time needed to set up an originating call. Also here the three scanners start in the rest position and stop at the first line in lockout. The identity of this line is put into a flip flop memory UTH, common to the marker and a control flip flop C is set. At this moment the marker becomes idle (except the memory) and can serve originating or terminating calls, after the release of relay LO.

The flip flops C corresponding to the different markers are scanned by the translator. When a flip flop C is found to be set the buffer circuit in the translator receives the identity stored in the memory and writes it down by means of a typewriter. Flip flop C is then reset by the buffer circuit. The reset of flip flop C indicates to the corresponding marker that it can continue scanning for the next line in the lockout state, again starting from the position indicated by the memory. When the scanners return to their initial starting position, the command which initiated the lock out verification is removed.

While we have described above the principles of our invention in connection with specific apparatus, it is to be clearly understood that this description is made only by way of example and not as a limitation to the scope of the invention.

What is claimed is:

1. In a communication switching system having a plurality of lines with line circuits individual thereto, having a switching network for selectively establishing originating connections between calling ones of said lines and called ones of said lines;

and having a marker comprising line identification apparatus with a plurality of identification devices, an originating selector, a route selector, a terminating selector, a supervisor's control means and a register-translator;

means responsive to a service request at a calling one of said lines to cause said marker to enter an originating call cycle, means also responsive to said service request to set a plurality of said devices of the line identifier apparatus to thereby record the identity of the calling line, means responsive to said recording of the calling line identity to cause the route selector to select an idle route, and means to cause a connection to be established through said switching network via the selected route, the marker then being returned to an idle state;

means responsive to the placement of the called line station into the on-hook condition to release said switching equipment;

lockout relay means in said line circuits operated upon release of said switching equipment and the associated calling subscriber station remaining off-hook to mark said line busy to incoming calls;

means responsive to the operation of the supervisor's control means upon a line circuit operation to the lockout state to remove said busy marking of said line and also operate a second means to place a second potential upon said busy indicating means;

means to actuate the line identifier in the same manner as on originating calls to select one of the lines having said mark and to set the identifier devices corresponding thereto, means responsive to the recording of the identity of a line by the line identification apparatus to select a route to said register-translator, and means to cause the line identifier apparatus to supply said locked out line's identity to said register for recording in said translator, the marker then being returned to an idle state.

2. In a communication switching system having a plurality of lines with line circuits individual thereto, having a switching network for selectively establishing originating connections between calling ones of said lines and called ones of said lines;

and having a marker comprising line identification apparatus with a plurality of identification devices, an originating selector, a route selector, a terminating selector, a supervisor's control means and a register-translator;

means responsive to a service request at a calling one of said lines to cause said marker to enter an originating call cycle, means also responsive to said service request to set a plurality of said devices of the line identifier apparatus to thereby record the identity of the calling line, means responsive to said recording of the calling line identity to cause the route selector to select an idle route, and means to cause a connection to be established through said switching network via the selected route, the marker then being returned to an idle state;

means responsive to the placement of the called line station into the on-hook condition to release said switching equipment;

lockout relay means in said line circuits, said lockout relay means at said calling one of said stations operated upon release of said switching equipment and the associated calling subscriber station remaining off-hook to mark said line busy to incoming calls;

means responsive to the operation of the supervisor's control means upon a line circuit operation to the lockout state to remove said busy marking of said line and also operate a second means to place a second potential upon said busy indicating means;

means to actuate the line identifier in the same manner as on originating calls in response to said second potential to select said line having said mark and to set the identifier devices corresponding thereto, means responsive to the recording of the identity of a line by the line identification apparatus with the supervisor's control means operated to select a route to said register-translator, and means to cause the line identifier apparatus to supply said locked out line's identity to said register for recording in said translator, the marker then being returned to an idle state.

3. In a cross-point switching system having a plurality of lines with lockout line circuits individual thereto, having a switching network for selectively establishing originating connections between calling ones of said lines and called ones of said lines;

said line circuit comprising a line relay, a cutoff relay and a lockout relay, said line relay operated upon the placement of said associated calling subscriber station into an offhook condition to supply a battery feed to said line and to connect a first service request potential to said line identifier apparatus, said cutoff relay operated at a called one of said line circuits upon completion of a connection thereto to remove the battery feed supply from the line to said station, said lockout relay operated in series with said cutoff relay, and having a marker comprising line identification apparatus with a plurality of identification devices, an originating selector, a route selector, a terminating selector, a supervisor's control means and a register-translator;

means responsive to a service request at a calling one of said lines to cause said marker to enter an originating call cycle, means also responsive to said service request to set a plurality of said devices of the line identifier apparatus to thereby record the identity of the calling line, means responsive to said recording of the calling line identity to cause the route selector to select an idle route, and means to cause a connection to be established through said switching network via the selected route, the marker then being returned to an idle state;

means responsive to the placement of the called line station into the on-hook condition to release said switching equipment;

said lockout relay means at said calling one of said stations line circuit remaining operated upon release of said switching equipment and the associated calling subscriber station remaining off-hook to mark said line busy to incoming calls;

means responsive to the operation of the supervisor's control means upon a line circuit operation to the lockout state to remove said busy marking of said line and also operate a second means to place a second potential upon said busy indicating means;

means to actuate the line identifier in the same manner as on originating calls in response to said second potential to select said line having said mark and to set the identifier devices corresponding thereto, means responsive to the recording of the identity of a line identification apparatus with the supervisor's control means operated to select a route to said register-translator, and means to cause the line identifier apparatus to supply said locked out line's identity to said register for recording in said translator, the marker then being returned to an idle state.

4. In a cross-point switching system having a plurality of lines with lockout line circuits individual thereto, having a switching network for selectively establishing originating connections between calling ones of said lines and called ones of said lines;

said line circuit comprising a line relay, a cutoff relay and a lockout relay, said line relay operated upon the placement of said associated calling subscriber station into an offhook condition to supply a battery feed to said line and to connect a first service request potential to said line identifier apparatus, said cutoff relay operated at a called one of said line circuits upon completion of a connection to remove the battery feed supply from the line to said station, said lockout relay operated in series with said cutoff relay and includes means to remain operated after release of said cutoff relay when said associated station remains offhook, and having a marker comprising line identification apparatus with a plurality of identification devices, an originating selector, a route selector, a terminating selector, a supervisor's control means and a register-translator;

means responsive to a service request at a calling one of said lines to cause said marker to enter an originating call cycle, means also responsive to said service request to set a plurality of said devices of the line identifier apparatus to thereby record the identity of the calling line, means responsive to said recording of the calling line identity to cause the route selector to select an idle route, and means to cause a connection to be established through said switching network via the selected route, the marker then being returned to an idle state;

means responsive to the placement of the called line station into the on-hook condition to release said switching equipment;

said lockout relay means at said calling one of said stations line circuit remaining operated upon release of said switching equipment and the associated calling subscriber station remaining off-hook to mark said line busy to incoming calls;

a relay means responsive to the operation of the supervisor's control means after a line circuit operation to the lockout state to remove said busy marking of said line circuit and also operate a second means to place a second potential upon said busy indicating means via a circuit means operated by said lockout relay;

means to actuate the line identifier in the same manner as on an originating call in response to said second potential to select said line having said mark and to set the identifier devices corresponding thereto, means responsive to the recording of the identity of a line by the line identification apparatus with the supervisor's control means operated to select a route to said register-translator, and means to cause the line identifier apparatus to supply said locked out line's identity to said register for recording in said translator, the marker then being returned to an idle state.

5. In a cross-point switching system having a plurality of lines with lockout line circuits individual thereto, having a switching network for selectively establishing originating connections between calling ones of said lines and called ones of said lines;

said line circuit comprising a line relay, a cut-off relay and a lockout relay, said line relay operated upon the placement of said associated calling subscriber station into an offhook condition to supply a battery feed to said line and to connect a first service request potential to said line identifier apparatus, said cutoff relay operated at a called one of said line circuits upon completion of a connection to remove the battery feed supply from the line to said station, said lockout relay operated in series with said cutoff relay and includes means to remain operated after release of said cutoff relay when said associated station remains offhook, and having a marker comprising line identification apparatus with a plurality of identification devices, an originating selector, a route selector, a terminating selector, a supervisor's control means and a register-translator;

means responsive to a service request at a calling one of said lines to cause said marker to enter an originating call cycle, means also responsive to said service request to set a plurality of said devices of the line identifier apparatus to thereby record the identity of the calling line, means responsive to said recording of the calling line identity to cause the route selector to select an idle route, and means to cause a connection to be established through said switching network via the selected route, the marker then being returned to an idle state;

means responsive to the placement of the called line station into the on-hook condition to release said switching equipment;

said lockout relay means at said calling one of said stations line circuit remaining operated upon release of said switching equipment and the associated calling subscriber station remaining off-hook to keep said line marked busy to incoming calls; other means comprising a make contact on said lockout relay to prevent reoperation of said lockout relay after release thereof by the placement of said associated station into the on-hook condition, a relay means responsive to the operation of the supervisor's control means after a line circuit operation to the lockout state to remove said busy marking of said line circuit and also operate a second means to place a second potential upon said busy indicating means via a circuit means operated by said lockout relay;

means to actuate the line identifier in the same manner as on originating calls in response to said second potential to select said line having said mark and to set the identifier devices corresponding thereto, means responsive to the recording of the identity of a line by the line identification apparatus with the supervisor's control means operated to select a route to said register-translator, and means to cause the line identifier apparatus to supply said locked out line's identity to said register for recording in said translator, the marker then being returned to an idle state.

6. In a crosspoint switching system having a plurality of lines with lockout line circuits individual thereto, having a switching network for selectively establishing originating connections between calling ones of said lines and called ones of said lines;

said line circuit comprising a line relay, a cut-off relay and a lockout relay, said line relay operated upon the placement of said associated calling subscriber station into an offhook condition to supply a battery feed to said line and to connect a first service request potential to said line identifier apparatus, said cutoff relay operated at a called one of said line circuits upon completion of a connection to remove the battery feed supply from the line to said station, said lockout relay operated in series with said cutoff relay and includes means to remain operated after release of said cutoff relay when said associated station remains offhook, and having a marker comprising line identification apparatus with a plurality of identification devices, an originating selector, a route selector, a terminating selector, a supervisor's control means and a register-translator;

means responsive to a service request at a calling one of said lines to cause said marker to enter an originating call cycle, means also responsive to said service request to set a plurality of said devices of the line identifier apparatus to thereby record the identity of the calling line, means responsive to said recording of the calling line identity to cause the route selector to select an idle route, and means to cause a connection to be established through said switching network via the selected route, the marker then being returned to an idle state;

means responsive to the placement of the called line station into the on-hook condition to release said switching equipment;

said lockout relay means at said calling one of said stations line circuit remaining operated upon release of said switching equipment and the associated calling subscriber station remaining off-hook to keep said line marked busy to incoming calls;

other means comprising a make contact on said lockout relay to prevent reoperation of said lockout relay after release thereof by the placement of said associated station into the on-hook condition;

a relay means responsive to the operation of the supervisor's control means after a line circuit operation to the lockout state to remove said busy marking of said line circuit and also operate a second means to place a second potential upon said busy indicating means via a circuit means operated by said lockout relay;

means to actuate the line identifier in the same manner as on originating calls in response to said second potential to select said line having said mark and to set the identifier devices corresponding thereto, means responsive to the recording of the identity of a line by the line identification apparatus with the supervisor's control means operated to select a route to said register-translator, and means to cause the line identifier apparatus to supply said locked out line identity to said register for recording in said translator, the marker then being returned to an idle state, said line identifier further including a line identity marking means to register the identity of the last line circuit in the lockout state that was identified, and a control means responsive to a subsequent start of the line identification means for another locked out line circuit to start the operation from said last marked circuit.

References Cited

UNITED STATES PATENTS

| | | | |
|---|---|---|---|
| 3,176,078 | 3/1965 | Warman | 179—18.3 |
| 3,231,681 | 1/1966 | Warman | 179—18.3 |

KATHLEEN H. CLAFFY, *Primary Examiner.*

WILLIAM C. COOPER, *Examiner.*